United States Patent
Isobe et al.

(10) Patent No.: US 7,960,933 B2
(45) Date of Patent: Jun. 14, 2011

(54) MOTOR CONTROL APPARATUS

(75) Inventors: Eiji Isobe, Kariya (JP); Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 470 days.

(21) Appl. No.: 12/245,147

(22) Filed: Oct. 3, 2008

(65) Prior Publication Data
US 2009/0091284 A1 Apr. 9, 2009

(30) Foreign Application Priority Data
Oct. 5, 2007 (JP) .................................. 2007-261461

(51) Int. Cl.
*H02P 1/04* (2006.01)
(52) U.S. Cl. ......... 318/466; 318/468; 318/471; 318/798
(58) Field of Classification Search .................. 318/798, 318/799, 471, 560, 567, 568.1, 449, 466, 318/467, 468
See application file for complete search history.

(56) References Cited

U.S. PATENT DOCUMENTS

| | | | | |
|---|---|---|---|---|
| 4,747,269 A | * | 5/1988 | David | 60/445 |
| 5,801,509 A | * | 9/1998 | Sawa et al. | 318/705 |
| 6,200,177 B1 | * | 3/2001 | Scott et al. | 440/75 |
| 6,285,831 B1 | * | 9/2001 | Hara | 396/50 |
| 7,084,597 B2 | | 8/2006 | Nakai et al. | |
| 7,176,643 B2 | | 2/2007 | Yamada et al. | |
| 7,221,116 B2 | | 5/2007 | Nakai et al. | |
| 2006/0197489 A1 | | 9/2006 | Nakai et al. | |
| 2007/0182353 A1 | | 8/2007 | Kamio et al. | |

FOREIGN PATENT DOCUMENTS

JP 2002-323127 11/2002

\* cited by examiner

*Primary Examiner* — Rina I Duda
(74) *Attorney, Agent, or Firm* — Nixon & Vanderhye PC

(57) ABSTRACT

A P-range side delimiting position of a movable range of a range change mechanism is learned by rotating a motor to a corresponding rotational position, which corresponds to the P-range side delimiting position. A climb correction amount is set for a learning value of the P-range side delimiting position to correct the learning value of the P-range side delimiting position in view of presence of a relatively small angle of rotation of the motor beyond the corresponding rotational position, which corresponds to the P-range side delimiting position. The climb correction amount is set according to motor temperature information, which is one of a temperature of the motor and a temperature that relates to the temperature of the motor.

6 Claims, 6 Drawing Sheets

|  |  | POWER SOURCE VOLTAGE [V] | | |
| --- | --- | --- | --- | --- |
|  |  | 9 | 12 | 15 |
| AT OIL TEMPERATURE [°C] | -40 | 16 | ... | 20 |
|  | 40 | ⋮ | | ⋮ |
|  | 120 | 10 | ... | 14 |

MOTOR CONTROL APPARATUS

CROSS REFERENCE TO RELATED APPLICATION

This application is based on and incorporates herein by reference Japanese Patent Application No. 2007-261461 filed on Oct. 5, 2007.

BACKGROUND OF THE INVENTION

1. Field of the Invention

The present invention relates to a motor control apparatus that controls a rotational position of an electric motor, which changes an operational position of a control subject.

2. Description of Related Art

Lately, even in the automobile industry, many mechanical drive systems have been replaced with electrical drive systems, each of which uses an electric motor as a drive source thereof to satisfy a demand for improving installation space saving of the system, a demand for improving an easiness of assembling of the system, a demand for improving a controllability of the system and/or the like. For example, a range change mechanism of an automatic transmission of a vehicle has been changed to use an electric motor as a drive source thereof (see, for example, Japanese Unexamined Patent Publication No. 2002-323127). In this case, an output shaft is connected to a rotatable shaft of the electric motor through a speed reducing mechanism, and the range change mechanism is driven by this output shaft to change the range of the automatic transmission. In this case, an encoder, which senses a rotational angle, is provided to the motor. At the time of changing the range, the motor is rotated to a target position (a target count value), which corresponds to a target range based on a count value of output pulses of the encoder The rotational amount (a rotational angle) of the motor is converted into the rotational amount of the control subject (the operational amount of the range change mechanism) through a rotation transmission system, such as the speed reducing mechanism. Here, it should be noted that a play (looseness) exists between adjacent components of the rotation transmission system. For example, a play (backlash) exists between adjacent gears of the speed reducing mechanism. Furthermore, in a case where a connecting portion, which has a non-circular cross section (e.g., a polygonal cross section, a D-cut cross section) and is provided to a distal end portion of the rotatable shaft of the speed reducing mechanism, is fitted into an engaging hole of a connecting shaft of the control subject, a clearance is required to ease the fitting work for fitting the connecting portion of the rotatable shaft into the engaging hole of the connecting shaft of the control subject. Due to the presence of the play (looseness) in the rotation transmission system, which converts the rotational amount of the motor into the operational amount of the control subject, even when the rotational angle of the motor is correctly controlled based on a sensed value of a rotational angle sensor, an error, the amount of which corresponds to the play (looseness) of the rotation transmission system, is created in the rotational angle of the connecting shaft of the control subject (the operational amount of the range change mechanism). Thereby, the operational amount of the range change mechanism cannot be accurately controlled.

In view of the above disadvantage, as disclosed in Japanese Unexamined Patent Publication No. 2004-23932 (corresponding to U.S. Pat. No. 7,221,116), the amount of play in the rotation transmission system is learned by executing an abutment control operation, in which the motor is rotated until abutment to a delimiting position (a wall) of a movable range of the range change mechanism is made. Then, a target position is set (corrected) in view of a learning value of the delimiting position, which is learned through the abutment control operation.

Furthermore, as in the case of Japanese Unexamined Patent Publication No. 2004-23932 (corresponding to U.S. Pat. No. 7,221,116) where the motor is rotated slightly beyond the delimiting position upon the abutment of the motor to the delimiting position, an exceeding rotational angle of the motor, which exceeds the delimiting position, is increased as the torque of the motor is increased. In general, the torque of the motor changes depending on the electric power source voltage of the motor. Therefore, in the case of Japanese Unexamined Patent Publication No. 2004-23932 (corresponding to U.S. Pat. No. 7,221,116), a climb correction amount is provided to consider the exceeding rotational angle of the motor, which exceeds the delimiting position of the motor, upon the abutment of the motor to the delimiting position at the time of executing the abutment control operation. The climb correction amount is set based on the electric power source voltage of the motor, and the target position is corrected by the climb correction amount.

The torque of the motor is changed depending on the electric power source voltage of the motor and is also changed depending on the temperature of the coil (hereinafter, also referred to as the coil temperature) of the motor. When the coil temperature of the motor is increased, a resistance value of the coil is increased. Therefore, even in the case where the same power source voltage of the motor is applied, when the coil temperature of the motor is increased, the torque of the motor is reduced. Thus, the climb correction amount is changed depending on the temperature of the motor, and the learning accuracy of the amount of play is reduced to cause a reduction in the position change accuracy of the control subject.

SUMMARY OF THE INVENTION

The present invention is made in view of the above disadvantages. Therefore, it is an objective of the present invention to provide a motor control apparatus that is capable of limiting a reduction in a position change accuracy of a control subject, which results from a torque change caused by a temperature of an electric motor.

To achieve the objective of the present invention, there is provided a motor control apparatus that controls a rotational position of an electric motor, which is used as a drive source to change an operational position of a control subject, to a target position of the electric motor that corresponds to a target operational position of the control subject. The motor control apparatus includes a delimiting position learning means, a climb correction amount setting means, a reference position learning means, a target position setting means and a motor temperature information determining means. The delimiting position learning means is for learning one of first and second delimiting positions of a movable range of the control subject, which correspond to first and second rotational positions of the electric motor, respectively, by rotating the electric motor to a corresponding one of the first and second rotational positions, which corresponds to the one of the first and second delimiting positions of the movable range of the control subject. The climb correction amount setting means is for setting a climb correction amount for a learning value of the one of the first and second delimiting positions, which is learned by the delimiting position learning means, to correct the learning value of the one of the first and second delimiting positions in view of presence of a relatively small angle of rotation of the electric motor beyond the corresponding one of the first and second rotational positions upon the rotation of the electric motor to the corresponding one of the first and second rotational positions at time of learning the one of the first and second delimiting positions by the delimiting position learning means. The reference position learning means is for learning a reference position by correcting the learning value of the one of the first and second delimiting positions by the climb correction amount. The target position setting means is for setting the target position of the electric motor based on the reference position at time of changing the operational position of the control subject. The motor temperature information determining means is for sensing or estimating motor temperature information, which is one of a temperature of the electric motor and a temperature that relates to the temperature of the electric motor. The climb correction amount setting means sets the climb correction amount according to the motor temperature information.

To achieve the objective of the present invention, there is also provided a motor control apparatus, which includes a motor control means, a reference position learning means, a play amount learning means, a target position setting means and a motor temperature information determining means. The motor control means is for controlling a rotational position of an electric motor, which is used as a drive source to change an operational position of a control subject, to a target position of the electric motor that corresponds to a target operational position of the control subject. The reference position learning means is for learning one of first and second delimiting positions of a movable range of the control subject, which correspond to first and second rotational positions of the electric motor, respectively, as a reference position by rotating the electric motor to a corresponding one of the first and second rotational positions, which corresponds to the one of the first and second delimiting positions of the movable range of the control subject. The play amount learning means is for learning a play amount in a rotation transmission system located between the electric motor and the control subject by rotating the electric motor to each of the first and second rotational positions. The target position setting means is for setting the target position of the electric motor in view of a learning value of the play amount based on a learning value of the reference position, which is learned by the reference position learning means, at time of changing the operational position of the control subject. The motor temperature information determining means is for sensing or estimating motor temperature information, which is one of a temperature of the electric motor and a temperature that relates to the temperature of the electric motor. The play amount learning means executes the learning of the play amount upon satisfaction of at least one learning execution condition, which includes failing of the temperature indicated by the motor temperature information into a specific temperature range.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First to third embodiments of the present invention implemented in a range change control apparatus (including a motor control apparatus) of an automatic transmission will be described with reference to the accompanying drawings.

First Embodiment

A first embodiment of the present invention will be described with reference to FIGS. 1 to 5.

Figure 1:
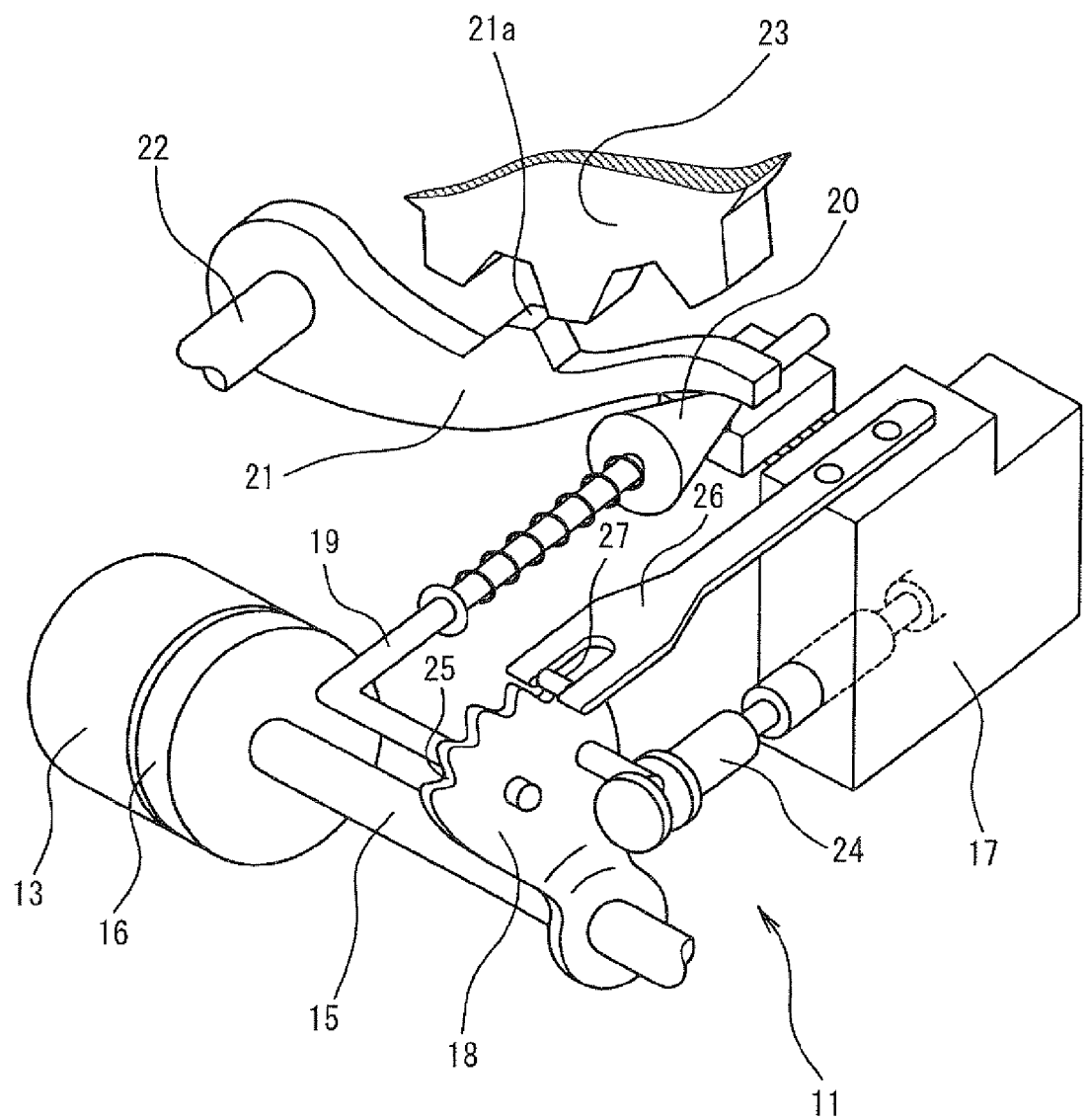
FIG. 1 is a perspective view of a range change apparatus according to a first embodiment of the present invention.
Figure 2:
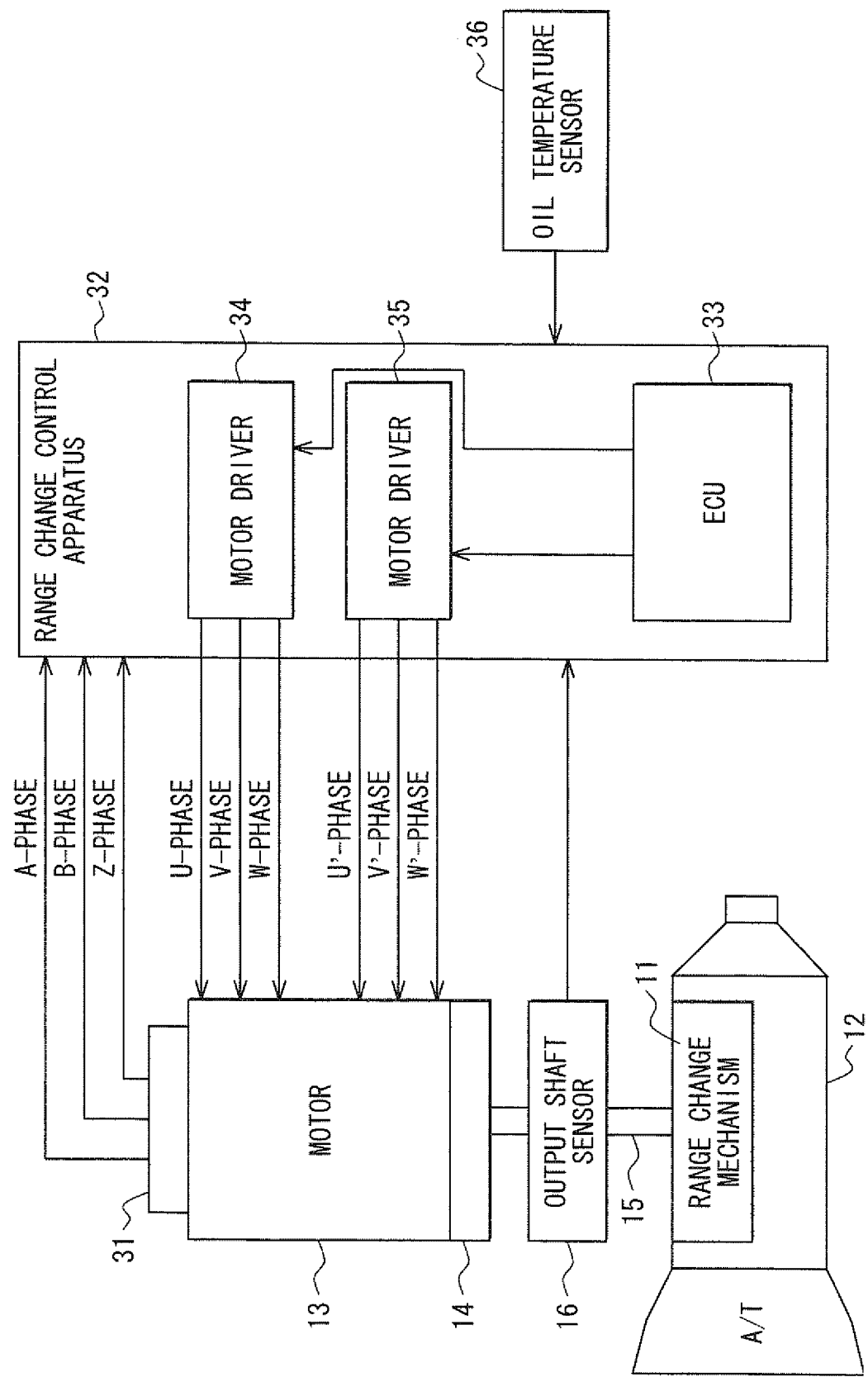
FIG. 2 is a schematic diagram showing an entire control system structure of the range change apparatus according to the first embodiment.

First, a structure of a range change mechanism (a control subject) 11 will be schematically described with reference to FIGS. 1 and 2.

The range change mechanism 11 is used to change a range of an automatic transmission 12 among a parking range (P), a reverse range (R), a neutral range (N) and a drive range (D). An electric motor 13, which serves as a drive source of a range change mechanism 11, may be, for example, a synchronous motor, such as a switched reluctance motor (SR motor). The motor 13 includes a speed reducing mechanism 14 (see FIG. 2), which reduces a rotational speed of a rotor of the motor 13. Furthermore, an output shaft sensor 16 is provided to the motor 13 to sense a rotational angle of an output shaft 15, which is engaged to and is thereby connected to a rotatable shaft of the speed reducing mechanism 14. The output shaft sensor 16 is a rotational angle sensor (e.g., a potentiometer), an output voltage of which linearly changes in response to the rotational angle of the output shaft 15 of the speed reducing mechanism 14 of the motor 13. The current rotational angle of the output shaft 15 is determined based on this output voltage. Then, based on the current rotational angle of the output shaft 15, it is possible to determine which one of the P-range, the R-range, the N-range and the D-range is the current range.

A detent lever 18 is fixed to the output shaft 15 to change a manual valve 17 of a hydraulic circuit of the automatic transmission 12. A parking rod 19, which is configured into an L-shape, is fixed to the detent lever 18. A conical body 20, which is provided at a distal end portion of the parking rod 19, contacts a lock lever 21. The lock lever 21 is pivoted upward or downward about a shaft 22 depending on a position of the conical body 20 to lock or unlock a parking gear 23. The parking gear 23 is provided to an output shaft of the automatic transmission 12. When the parking gear 23 is locked by the lock lever 21, a driving wheel of the vehicle is held in a non-rotatable state (a parking state).

A spool valve 24 of the manual valve 17 is connected to the detent lever 18. When the detent lever 18 is rotated integrally with the output shaft 15 by the motor 13, an operational amount of the manual valve 17 (a position of the spool valve 24) is changed to change the range of the automatic transmission 12 to the corresponding one of the P-range, the R-range, the N-range and the D-range. Four holding recesses 25 (see FIG. 3), which correspond to the above four ranges, respectively, are formed in the detent lever 18 to hold the spool valve 24 to the corresponding position, which corresponds to the one of the four ranges.

A detent spring 26 is fixed to the manual valve 17 to hold the detent lever 18 to the corresponding position, which corresponds to the one of the four ranges. When an engaging portion 27, which is provided to a distal end of the detent spring 26, is received in the holding recess 25 of the target range in the detent lever 18, the detent lever 18 is held at the rotational angle of the target range. Thereby, the position of the spool valve 24 of the manual valve 17 is held in the position of the target range.

In the P-range, the parking rod 19 is moved toward the lock lever 21, so that a large diameter portion of the conical body 20 pushes the lock lever 21 upward. Thereby, a protrusion 21a of the lock lever 21 is received in the parking gear 23 to lock the parking gear 23. In this way, the output shaft (the drive wheel) of the automatic transmission 12 is placed in the locked state (the parking state).

In any of the other three ranges, which are other than the P-range, the parking rod 19 is moved in a direction away from the lock lever 21. Thereby, the large diameter portion of the conical body 20 is removed from the lock lever 21, so that the lock lever 21 is pivoted downward. In this way, the protrusion 21a of the lock lever 21 is released from the parking gear 23 to unlock the parking gear 23. Therefore, the output shaft of the automatic transmission 12 is held in the rotatable state (drivable state of the vehicle).

An encoder 31 is provided to the motor 13 to sense the rotational angle of the rotor of the motor 13. The encoder 31 may be, for example, a magnetic rotary encoder. The encoder 31 outputs pulse signals of an A-phase, a B-phase and a Z-phase synchronously with the rotation of the rotor of the motor 13 to a range change control apparatus 32. An ECU 33 (a motor control means) of the range change control apparatus 32 counts rising/falling edges of the A-phase and B-phase signals, which are outputted from the encoder 31. Based on this encoder count value, the ECU 33 sequentially changes the energization phases of the motor 13 in a predetermined order through motor drivers 34, 35.

At this time, the rotational direction of the rotor of the motor 13 is determined based on the generating order of the A-phase and B-phase signals (i.e., based on which one of the A-phase signal and the B-phase signal is generated first). In the case of the normal rotation (i.e., the rotation in the rotational direction of the P-range to the D-range), the encoder count value is counted up. On the other hand, in the case of the reverse rotation (i.e., the rotation in the rotational direction of the D-range to the P-range), the encoder count value is counted down. In this way, when the motor 13 is rotated in any one of the normal rotational direction and the reverse rotational direction, the appropriate relationship between the encoder count value and the rotational angle of the motor 13 is maintained. Thereby, in any one of the normal rotational direction and the reverser rotational direction, the rotational angle of the motor 13 is appropriately sensed based on the encoder count value, and the winding of each corresponding one of the phases, which corresponds to the sensed rotational angler is appropriately energized to rotate the motor 13. Here, it should be noted that the Z-phase signal (index signal) of the encoder 31 is used to sense a reference rotational angle of the rotor of the motor 13.

The rotational amount (rotational angle) of the motor 13 is converted into the operational amount of the range change mechanism 11 (the slide amount of the parking rod 19) through the rotational transmission system, which includes the speed reducing mechanism 14, the output shaft 15 and the detent lever 18. Here, it should be noted that a play (looseness) exists between the components of the rotation transmission system. For example, in a case where a backlash exists between the adjacent gears of the speed reducing mechanism 14, and a connecting portions which is formed at the distal end portion of the rotatable shaft of the motor 13 and has a non-circular cross section, is fitted and connected into an engaging hole of the output shaft 15, a clearance needs to be provided between them to ease the work for engaging between the connecting portion of the rotatable shaft of the motor 13 and the engaging hole of the output shaft 15.

Figures 3, 4:
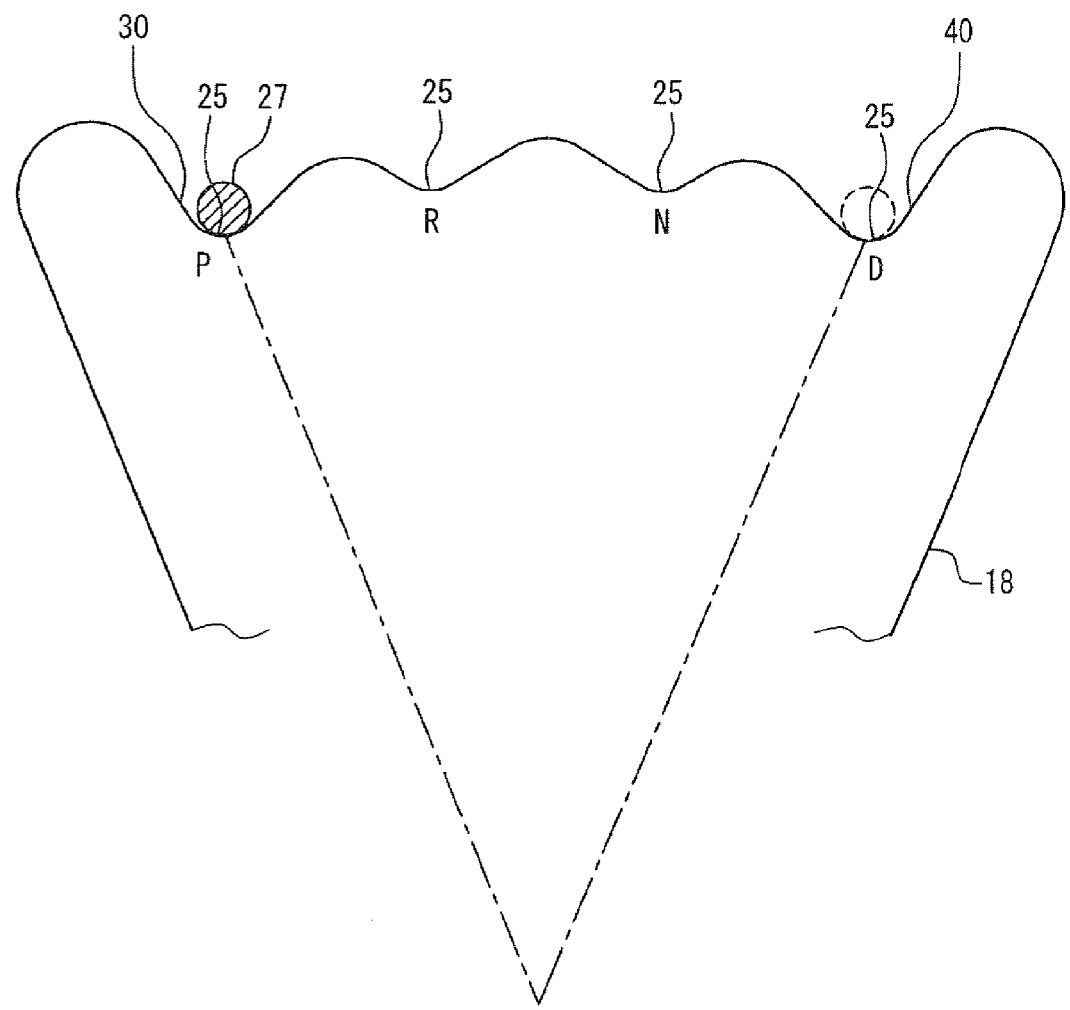
FIG. 3 is a schematic diagram for describing a relationship between holding recesses of a detent lever and an engaging portion of a detent spring.
FIG. 4 is a diagram showing an example of a map used to compute a climb correction amount based on an AT oil temperature and an electric power source voltage of a motor, which serve as parameters, according to the first embodiment.

Furthermore, as shown in FIG. 3, when the engaging portion 27 of the detent spring 26 is received in the holding recess 25 of, for example, the P-range or the D-range, a small gap (looseness) exists between the engaging portion 27 and a side wall of the holding recess 25. As described above, in the rotation transmission system, which converts the rotational amount of the motor 13 into the operational amount of the range change mechanism 11 (the slide amount of the parking rod 19), the play (looseness) exists between the corresponding components of the rotation transmission system. Therefore, even when the rotational amount (rotational angle) of the motor 13 is accurately controlled based on the encoder count value, an error, which corresponds to the play (looseness) of the rotation transmission system, is created in the operational amount of the range change mechanism 11. Thereby, the operational amount of the range change mechanism 11 cannot be accurately controlled.

In order to address the above disadvantage, the ECU 33 of the first embodiment has a learning function for learning the amount of play (hereinafter, also referred to as the play amount) in the rotation transmission system. This learning function serves as a play amount learning means. Specifically, at the time of learning the play amount in the rotation transmission system, the motor 13 is rotated in the reverse direction until the engaging portion 27 of the detent spring 26 abuts a side wall 30 of the P-range holding recess 25 (hereinafter, also referred to as a P-range wall 30), which is a P-range side delimiting position of the movable range of the range change mechanism 11, to learn an encoder count value (a corresponding rotational position of the motor 13) GNp of the P-range wall position (hereinafter, referred to as a P-range wall position learning value). This control operation will be hereinafter referred to as a P-range wall abutment control operation. Furthermore, the motor 13 is rotated in the normal direction until the engaging portion 27 of the detent spring 26 abuts a side wall 40 of the D range holding recess 25 (hereinafter, also referred to as a D-range wall 40), which is a D-range side delimiting position of the movable range of the range change mechanism 11, to learn an encoder count value (a corresponding rotational position of the motor 13) GNd of the D-range wall position (a D-range wall position learning value). This control operation will be hereinafter referred to as a D-range wall abutment control operation. The function of learning the P-range wall position serves as a delimiting position learning means.

Thereafter, the amount of change (the amount of increase/decrease) in the encoder count value from the P-range wall position to the D-range wall position is obtained as an actual measurement value ΔNact of the movable range of the range change mechanism 11. Then, the amount of difference between the actual measurement value ΔNact of the movable range and a designed value ΔNs of the movable range is learned as the play amount ΔG in the rotation transmission system.

$$\Delta Nact = GNd - GNp$$

$$\Delta G = \Delta Nact - \Delta Ns$$

Furthermore, at the time of executing the P-range wall abutment control operation, the engaging portion 27 of the detent spring 26 may slightly climb up a slope of the side wall 30 of the holding recess 25 for a relatively small angle while the engaging portion 27 of the detent spring 26 maintains the abutment against the side wall 30 of the P-range holding recess 25 of the detent lever 18. In the first embodiment, in view of the presence of this slight climb angle, a climb correction amount ΔNover is set for the encoder count value GNp of the P-range wall position (this function serving as a climb correction amount setting means). The encoder count value GNp of the P-range wall position is corrected by the climb correction amount ΔNover, so that a learning value Np of the reference position is obtained (this function serving as a reference position learning means).

$$Np = GNp - \Delta Nover$$

Thereafter, at the time of rotating the motor 13 to a target position (a target count value), the target position is set based on the learning value Np of the reference position in view of a learning value ΔG of the play amount in the rotation transmission system (this function serving as a target position setting means). In this way, at the time of executing the P-range wall abutment control operation, even in the case where the engaging portion 27 of the detent spring 26 slightly climbs up the slope of the side wall 30 of the holding recess 25 of the P-range for the relatively small angle while maintain the abutment against the side wall 30 of the holding recess 25 of the P-range, and/or in the case where the play (looseness) exists in the rotation transmission system, the target position can be set in view of such a climb angle and/or the play in the rotation transmission system. Therefore, the operational amount of the range change mechanism 11 can be more accurately controlled.

The climb angle of the engaging portion 27 of the detent spring 26 over the slope of the side wall 30 of the holding recess 25 of the P-range at the time of executing the P-range wall abutment control operation (the time of learning the reference position) is increased as the torque of the motor 13 is increased. Therefore, it is desirable to increase the climb correction amount ΔNover as the torque of the motor 13 is increased, and vice versa.

In this case, the torque of the motor 13 changes depending on the electric power source voltage of the motor 13 and also depending on the coil temperature of the motor 13. That is, when the coil temperature of the motor 13 increases, the resistance value of the coil of the motor 13 increases. Therefore, even in the case where the electric power source voltage of the motor 13 is the same, when the coil temperature of the motor 13 increases, the torque of the motor 13 decreases. Also, the motor 13, which drives the range change mechanism 11, is installed to the automatic transmission. Therefore, the temperature of the automatic transmission has the influence to cause the change in the temperature of the motor 13. Furthermore, lately, the automatic transmission has an oil temperature sensor 36, which senses the oil temperature to execute the gear change control operation. Therefore, it is possible to use the oil temperature, which is sensed with the oil temperature sensor 36, as the temperature information (temperature of the automatic transmission), which relates to the temperature of the motor 13.

In view of the above matter, according to the first embodiment, the oil temperature of the automatic transmission (hereinafter, referred to as an AT oil temperature) is sensed with the oil temperature sensor 36 (a motor temperature information determining means), which is provided to the automatic transmission. The sensed AT oil temperature is used as motor temperature information, which relates to the temperature of the motor 13. Furthermore, a map of the climb correction amount ΔNover of FIG. 4 is provided to compute the climb correction amount ΔNover in view of the AT oil temperature and the electric power source voltage of the motor 13, which are used as parameters. With use of the map of FIG. 4, there is computed the climb correction amount ΔNover that corresponds to the AT oil temperature, which is sensed at the time of executing the P-range wall abutment control operation (at the time of learning the reference position), as well as the electric power source voltage (the battery voltage) of the motor 13.

When the AT oil temperature (the temperature of the motor 13) increases, the resistance value of the coil of the motor 13 increases to cause the decrease in the torque of the motor 13. In view of this fact, the map of the climb correction amount ΔNover shown in FIG. 4 is set such that the climb correction amount ΔNover decreases when the AT oil temperature (the temperature of the motor 13) increases. Also, when the electric power source voltage of the motor 13 decreases, the torque of the motor 13 decreases. In view of this fact, the map of the climb correction amount ΔNover shown in FIG. 4 is set such that the climb correction amount ΔNover decreases when the electric power source voltage of the motor 13 decreases.

The computation of the learning value Np of the reference position, which is corrected by the climb correction amount ΔNover, is executed as follows according to a reference position learning routine shown in FIG. 5.

Figure 5:
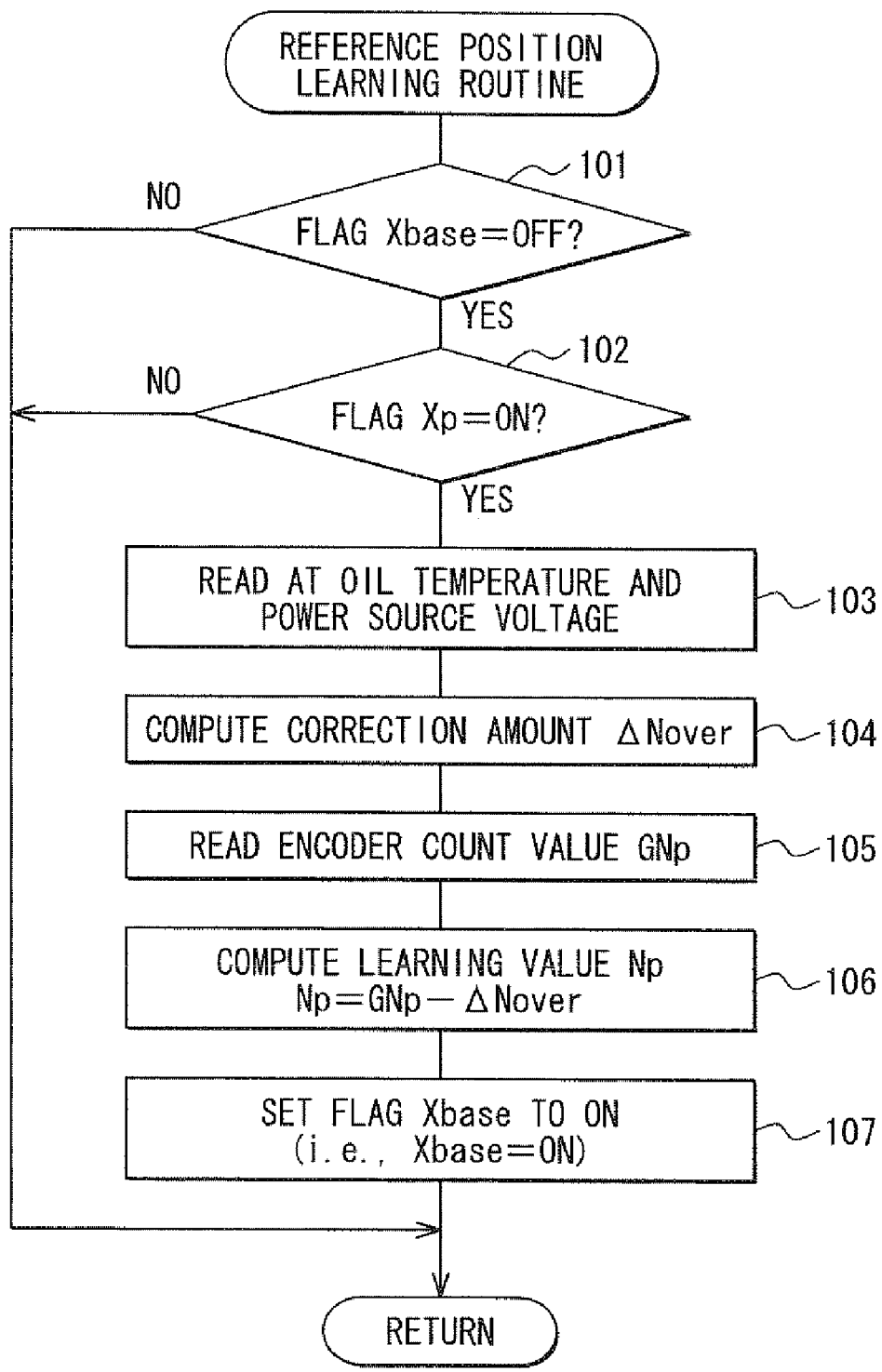
FIG. 5 is a flowchart showing a flow of a reference position learning routine according to the first embodiment.

The reference position learning routine of FIG. 5 is executed repeatedly at predetermined intervals during the ON-period of the ignition switch (during the ON-period of the electric power source of the ECU 33) and serves as the climb correction amount setting means and the reference position learning means. When this routine starts, at step 101, it is determined whether a reference position learning completion flag Xbase is in an OFF-state, which indicates an unfinished state of the learning of the reference position. When it is determined that the reference position learning completion flag Xbase is in an ON-state (a finished state of the learning) at step 101, the present routine is terminated without executing any further steps. In this way, the learning of the reference position is executed only once during the ON-period of the ignition switch. The reference position learning completion flag Xbase is reset to the OFF-state by an initialization routine (not shown), which is executed right after the turning on of the ignition switch.

In contrast, when it is determined that the reference position learning completion flag Xbase is in the OFF-state (unfinished state of the learning) at step 101, the control proceeds to step 102. At step 102, it is determined whether a P-range wall abutment completion flag Xp is in an ON-state to determine whether the P-range wall abutment control operation is completed. When it is determined that the P-range wall abutment completion flag Xp is in an OFF-state at step 102 (state before completion of the P-range wall abutment control operation), the present routine is terminated without executing any further steps.

When it is determined that the P-range wall abutment completion flag Xp is in an ON-state (a state after the completion of the P-range wall abutment control operation) at step 102, control proceeds to step 103. At step 103, the AT oil temperature, which is sensed with the oil temperature sensor 36 at the time of executing the P-range wall abutment control operation, as well as the electric power source voltage (the battery voltage) of the motor 13 are read. Thereafter, at step 104, there is computed the climb correction amount ΔNover that corresponds to the AT oil temperature, which is sensed at the time of executing the P-range wall abutment control operation, as well as the electric power source voltage of the motor 13 in view of the map of the climb correction amount ΔNover shown in FIG. 4.

Thereafter, control proceeds to step 105 where the encoder count value GNp of the P-range wall position, which is learned through the P-range wall abutment control operation, is read. Thereafter, at step 106, this encoder count value GNp of the P-range wall position is corrected by the climb correction amount ΔNover to obtain the learning value Np of the reference position, and this learning value Np of the reference position is stored in a memory of the ECU 33.

Np=GNp−ΔNover

Then, at the following step 107, the reference position learning completion flag Xbase is set to the ON-state (the finished state of the learning), and the present routine is terminated.

Thereafter, at the time of rotating the motor 13 to the target position (the target count value Acnt), the target position (the target count value Acnt) is set based on the learning value Np of the reference position in view of the learning value ΔG of the play amount in the rotation transmission system.

For example, in the case of changing from the P-range to the D-range, the target count value Acnt is set to the value, which is obtained by adding the learning value ΔG of the play amount in the rotation transmission system to the target count value (Np+Nd) of the D-range that is computed at the time of designing.

Acnt=Np+Nd+ΔG

Similarly, in the case of changing from the P-range to the R-range, the target count value Acnt is set to the value, which is obtained by adding the learning value ΔG of the play amount in the rotation transmission system to the target count value (Np+Nr) of the R-range that is computed at the time of designing. Here, Nr represents the design value between the P-range and the R-range.

Acnt=Np+Nr+ΔG

According to the first embodiment, as discussed above, at the time of executing the P-range wall abutment control operation, the engaging portion 27 of the detent spring 26 may slightly climb up the slope of the side wall 30 of the holding recess 25 of the detent lever 18 for the relatively small angle while the engaging portion 27 of the detent spring 26 maintains the abutment against the side wall 30 of the P-range holding recess 25 of the detent lever 18. In view of the presence of this slight climb angle, the climb correction amount ΔNover is set for the encoder count value GNp of the P-range wall position. At this time, the climb correction amount ΔNover is set according to the AT oil temperature, which is sensed with the oil temperature sensor 36 that is provided to the automatic transmission. Therefore, in response to the change in the actual climb angle, which is caused by the change in the torque of the motor 13 that is in turn caused by the change in the temperature of the motor 13, it is possible to set the appropriate climb correction amount ΔNover in response to the temperature of the motor 13, which is sensed at the time of executing the P-range wall abutment control operation. Thereby, the correction accuracy of the reference position Np through use of the climb correction amount ΔNover can be improved. As a result, it is possible to limit the reduction of the range change accuracy caused by the torque change induced by the change in the temperature of the motor 13.

Furthermore, in the first embodiment, the AT oil temperature, which is sensed with the preexisting oil temperature sensor 36 installed in the automatic transmission, is used as the motor temperature information. Thereby, the motor temperature information can be obtained without newly installing an additional temperature sensor for sensing the temperature of the motor 13. As a result, it is possible to satisfy the demand for reducing the costs.

However, it should be noted that the temperature of the motor 13 may be actually measured by providing a temperature sensor to the motor 13 depending on a need.

Second Embodiment

In the first embodiment, the influence of the torque change caused by the change in the temperature of the motor 13 is substantially eliminated or reduced through use of the climb correction amount ΔNover. Alternatively, in a second embodiment, the influence of the torque change caused by the change in the temperature of the motor 13 is substantially eliminated by executing a play amount learning routine shown in FIG. 6. With this routine, the play amount ΔG in the rotation transmission system is learned only at the time, in which the AT oil temperature that relates to the temperature of the motor 13 is in a specific temperature range. Furthermore, according to the second embodiment, the reference position learning routine shown in FIG. 7 is executed to learn the P-range wall position as the reference position at the time of setting the target range to the P-range first time right after the turning on of the ignition switch (right after the turning on of the electric power source of the ECU 33). The procedure of each of these routines will be described in detail.

Figure 6:
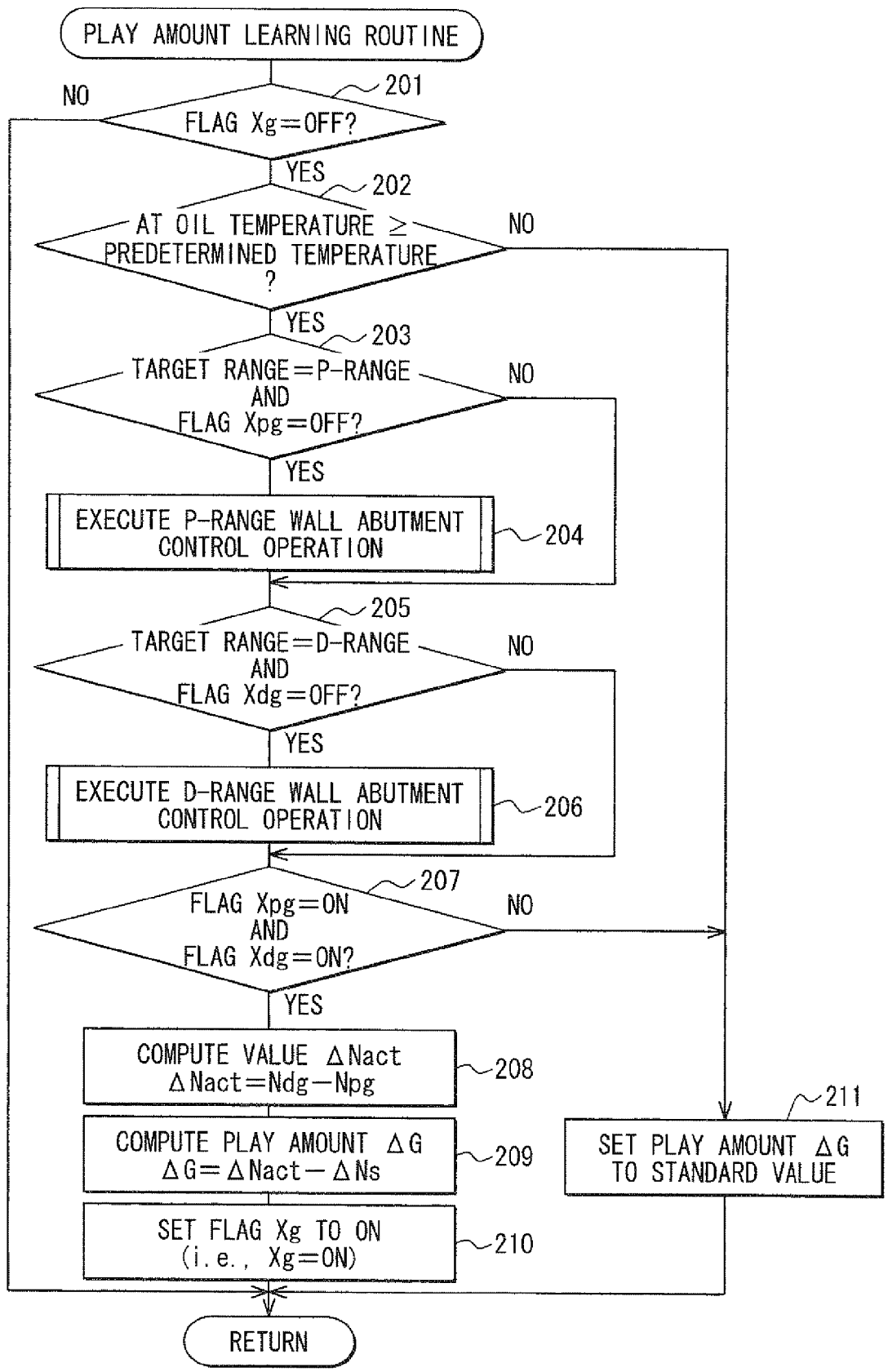
FIG. 6 is a flowchart showing a flow of a play amount learning routine according to a second embodiment of the present invention.
Figure 7:
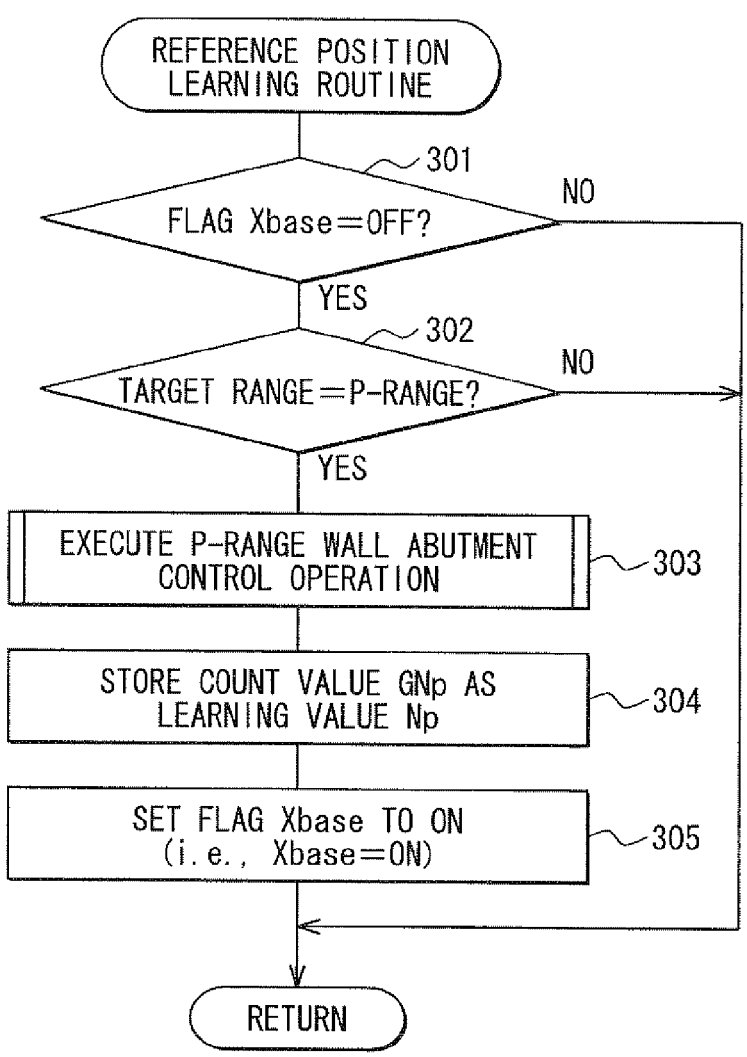
FIG. 7 is a flowchart showing a flow of a reference position learning routine according to the second embodiment of the present invention.

The play amount learning routine of FIG. 6 is executed repeatedly at predetermined intervals during the ON-period of the ignition switch (during the ON-period of the electric power source of the ECU 33) and serves as the play amount learning means. When this routine starts, at step 201, it is determined whether a play amount learning completion flag Xg is in an OFF-state (a state before completion of the play amount learning). When it is determined that the play amount learning completion flag Xg is in an ON-state (a state after the completion of the play amount learning) at step 201, the present routine is terminated without executing any further steps. In this way, the play amount learning is executed only once during the ON-period of the ignition switch. The play amount learning completion flag Xg is reset to the OFF-state by an initialization routine (not shown), which is executed right after the turning on of the ignition switch.

In contrast, when it is determined that the play amount learning completion flag Xg is in the OFF-state (the state before the completion of the play amount learning), control proceeds to step 202. At step 202, it is determined whether the AT oil temperature is equal to or higher than a predetermined temperature (e.g., equal to or higher than an engine warming up completion temperature) to determine whether the AT oil temperature, which is sensed with the oil temperature sensor 36, is in the specific temperature range, in which the learning of the play amount ΔG is permitted.

Here, the specific temperature range, in which the learning of the play amount ΔG is permitted, is not limited to the temperature range equal to or higher than the predetermined temperature (e.g., equal to or higher than the engine warming up completion temperature) and may be alternatively a temperature range equal to or lower than the predetermined temperature or a predetermined temperature range (a range between a temperature A degree Celsius and a temperature B degree Celsius where the temperature A degree Celsius and the temperature B degree Celsius may be any suitable temperatures, respectively). What matters is that the range of the temperature of the motor 13 (the AT oil temperature) for executing the learning of the play amount ΔG is limited, so that the learning of the play amount ΔG is executed under the condition where the variation in the torque of the motor 13 caused by the temperature of the motor 13 is relatively small. In the second embodiment, the temperature range equal to or higher than the predetermined temperature (e.g., equal to or higher than the engine warming up completion temperature), which is the temperature range that can be easily satisfied, is set as a learning executing condition for executing the learning of the play amount ΔG. Thereby, the learning of the play amount ΔG is executed in an earlier possible stage.

When it is determined that the AT oil temperature is less than the predetermined temperature at step 202, it is then determined that the learning of the play amount ΔG is prohibited. Thereby, control proceeds to step 211. At step 211, a standard value (e.g., a designed median of the play amount specified in design data, a median of the play amounts of sampled actual products, a mean of the play amounts of sampled actual products or an actual measurement value of a standard product) is set as the play amount ΔG, and the present routine is terminated.

In contrast, when it is determined that the AT oil temperature is equal to or higher the predetermined temperature at step 202, it is then determined that the AT oil temperature is in the temperature range, in which the learning of the play amount ΔG is permitted. Therefore, control proceeds to step 203 where it is determined whether the target range is the P-range, and it is also determined whether a play amount learning time P-range wall abutment completion flag Xpg is in an OFF-state (a state before completion of play amount learning time P-range wall abutment). At step 203, when it is determined that the target range is the P-range, and the play amount learning time P-range wall abutment completion flag Xpg is in the OFF-state, YES is returned, and thereby the executing condition for executing the P-range wall abutment control operation is satisfied. Therefore, upon returning of YES at step 203, control proceeds to step 204 where the P-range wall abutment control routine is executed, and an encoder count value Npg of the P-range wall position (a play amount learning time P-range wall position learning value) is stored in the memory of the ECU 33, and control proceeds to step 205.

In contrast, when NO is returned at step 203, i.e., when the play amount learning time P-range wall abutment completion flag Xpg is in the ON-state (the state after the completion of the play amount learning time P-range wall abutment), control proceeds to step 205 without executing the P-range wall abutment control operation (step 204).

At step 205, it is determined whether the target range is the D-range, and it is also determined whether a play amount learning time D-range wall abutment completion flag Xdg is in an OFF-state (a state before completion of play amount learning time D-range wall abutment). At step 205, when it is determined that the target range is the D-range, and the play amount learning time D-range wall abutment completion flag Xdg is in the OFF-state, YES is returned, and thereby the executing condition for executing the D-range wall abutment control operation is satisfied. Therefore, upon returning of YES at step 205, control proceeds to step 206 where the D-range wall abutment control operation is executed, and an encoder count value Ndg of the D-range wall position (a play amount learning time D-range wall position learning value) is stored in the memory of the ECU 33, and control proceeds to step 207.

In contrast, when NO is returned at step 205, i.e., when the play amount learning time D-range wall abutment completion flag Xdg is in the ON-state (the state after the completion of the play amount learning time D-range wall abutment), control proceeds to step 207 without executing the D-range wall abutment control operation (step 206).

At this step 207, it is determined whether both of the P-range wall abutment control operation and the D-range wall abutment control operation have completed (i.e., whether the current state is the play amount learning time P-range wall abutment completion flag Xpg=ON and the play amount learning time D-range wall abutment completion flag Xdg=ON). When it is determined any one of the P-range wall abutment control operation and the D-range wall abutment control operation has not completed at step 207, control proceeds to step 211. At step 211, the standard value is set as the play amount ΔG, and the present routine is terminated.

In contrast, when it is determined that both of the P-range wall abutment control operation and the D-range wall abutment control operation have completed at step 207, control proceeds to step 208. At step 208, an actual measurement value ΔNact of the movable range of the motor 13 (the movable range of the detent lever 18) from the P-range wall 30 to the D-range wall 40 is computed by using the following equation based on the play amount learning time P-range wall position learning value Npg and the play amount learning time D-range wall position learning value Ndg.

$$\Delta Nact = Ndg - Npg$$

Thereafter, control proceeds to step 209. At step 209, the amount of difference between the actual measurement value ΔNact of the movable range of the motor 13 (the movable range of the detent lever 18) and the designed value ΔNs of the movable range of the motor 13 is learned as the play amount ΔG in the rotation transmission system, which is then stored in the memory of the ECU 33.

$$\Delta G = \Delta Nact - \Delta Ns$$

Here, the designed value ΔNs of the movable range may be computed in advance based on the design data or may be a median of the movable ranges of sampled actual products, which are mass-produced (e.g., a median of the measured movable ranges of the standard products).

Thereafter, control proceeds to step 210 where the play amount learning completion flag Xg is set to the ON-state, which indicates the completion of the play amount learning, and the present routine is terminated.

The reference position learning routine of FIG. 7 is executed repeatedly at predetermined intervals during the ON-period of the ignition switch (during the ON-period of the electric power source of the ECU 33) and serves as the reference position learning means. When this routine starts, at step 301, it is determined whether the reference position learning completion flag Xbase is in the OFF-state, which indicates the unfinished state of the learning of the reference position. When it is determined that the reference position learning completion flag Xbase is in the ON-state (the finished state of the learning) at step 301, the present routine is terminated without executing any further steps. In this way, the learning of the reference position is executed only once during the ON-period of the ignition switch. The reference position learning completion flag Xbase is reset to the OFF-state by an initialization routine (not shown), which is executed right after the turning on of the ignition switch.

In contrast, when it is determined that the reference position learning completion flag Xbase is in the OFF-state (unfinished state of the learning) at step 301, the control proceeds to step 302. At step 302, it is determined whether the target range is the P-range. When it is determined that the target range is not the P-range at step 302, the present routine is terminated without executing the further steps.

When it is determined that the target range is the P-range at step 302, the executing condition for executing the P-range wall abutment control operation is satisfied. Therefore, control proceeds to step 303 where the P-range wall abutment control routine is executed. Thereafter, at step 304, the encoder count value GNp of the P-range wall position is stored as the learning value Np of the reference position in the memory of the ECU 33. At this time, the encoder count value GNp of the P-range wall position may possibly be corrected by the climb correction amount ΔNover, which corresponds to the electric power source voltage of the motor 13, to obtain the learning value Np of the reference position (at this time, it is not required to consider the temperature of the motor 13). Then, at the following step 305, the reference position learning completion flag Xbase is set to the ON-state (the finished state of the learning), and the present routine is terminated.

Even in the second embodiment, at the time of rotating the motor 13 to the target position (the target count value Acnt), the target position (the target count value Acnt) is set based on the learning value Np of the reference position in view of the play amount ΔG. At this time, if the learning of the play amount ΔG has not been executed, the standard value of the play amount ΔG (e.g., the designed median of the play amount, the median of the play amounts of the mass-produced products, the mean of the play amounts of mass-produced products or the actual measurement value of the standard product) is set as the play amount ΔG. Furthermore, if the learning of the play amount ΔG has been completed, the learning value of the play amount ΔG is used.

According to the second embodiment, the play amount ΔG in the rotation transmission system is learned while the AT oil temperature, which is the temperature information that relates to the temperature of the motor 13, is in the specific temperature range. Thus, the learning of the play amount ΔG can be executed under the condition where the variability of the torque of the motor 13, which is caused by the temperature of the motor 13, is relatively small. In this way, the learning accuracy of the play amount ΔG can be improved to limit the reduction of the range change accuracy caused by the torque change induced by the change in the temperature of the motor 13.

Furthermore, in the second embodiment, when the P-range is set as the target range first time right after the turning on of the ignition switch (right after the turning on of the electric power source of the ECU 33), the P-range wall position is learned as the reference position. The target position is set based on the learning value Np of the reference position in view of the standard value of the play amount ΔG in place of the learning value of the play amount ΔG in the case where the learning of the play amount ΔG has not been completed. Therefore, even in the case where the learning of the play amount ΔG has not been completed, the target position can be set with the certain accuracy.

Third Embodiment

In the second embodiment, the target position is set based on the learning value Np of the reference position in view of the standard value of the play amount ΔG in place of the learning value of the play amount ΔG in the case where the learning of the play amount ΔG has not been completed. Alternatively, according to a third embodiment shown in FIG. 8, when the P-range is set as the target range first time right after the turning on of the ignition switch (right after the turning on of the electric power source of the ECU 33), the P-range wall position is learned as the reference position. Furthermore, in the case where the learning of the play amount ΔG has not been completed, an overshooting control operation is executed at the time of changing the range, so that the motor 13 is rotated beyond the target range position (making the overshooting) and is thereafter reversed At this time, the overshooting amount of the motor 13 and the reversing amount of the motor 13 are set to be the same. Furthermore, a designed maximum value ΔGmax of the play amount in the rotation transmission system is set as the overshooting amount.

Figure 8:
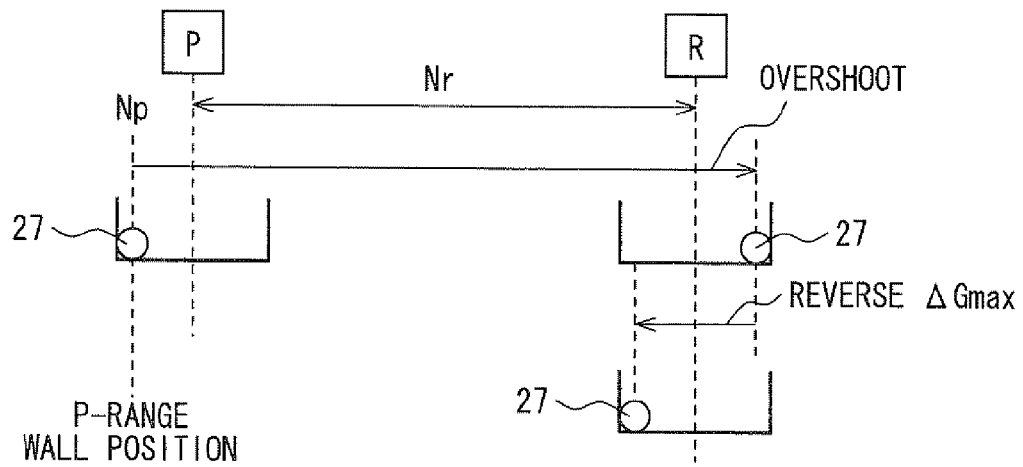
FIG. 8 is a schematic diagram showing a range change control operation from a P-range to an R-range before execution of play amount learning according to a third embodiment of the present invention.

For example, as shown in FIG. 8, in the case where the range is changed from the P-range to the R-range before the learning of the play amount ΔG, a value (Np+Nr+ΔGmax), which is obtained by adding the overshooting amount ΔGmax to the designed target count value (Np+Nr) of the R-range, is set as the target count value. In this way, the motor 13 is rotated in the direction (the normal rotational direction) from the P-range to the R-range, and the operational position of the detent lever 18 reaches the original target position of the R-range, and the rotational position of the motor 13 exceeds beyond the original target position of the R-range.

After the completion of this overshooting, the target count value is returned to the original target count value (Np+Nr) of the R-range. In this way, the rotational position of the motor 13 is shifted backward (reversed) by the overshooting amount ΔGmax (the designed maximum value of the play amount). At this time, the detent lever 18 is not reversed, and only the motor 13 is rotated by the amount, which corresponds to the play (looseness) in the rotation transmission system.

In this case, when the overshooting amount ΔGmax of the motor 13 becomes larger than the actual play amount in the rotation transmission system, the detent lever 18 is moved beyond the target position by the amount, which corresponds to a difference between the overshooting amount ΔGmax and the play amount However, even in such a case, when the overshooting amount ΔGmax and the reversing amount are set to be the same, the operational position of the detent lever 18 can be reliably reversed to the target position by the reverse rotation of the motor 13. In this way, the range can be accurately changed to the target range without being influenced by the play amount ΔG even before the learning of the play amount ΔG.

Upon the learning of the play amount ΔG, at the time of changing the range, the target count value (the target position) is set in view of the learning value of the play amount ΔG. Thereby, the motor 13 is stopped at the position, which coincides with the target count value, without making the overshooting of the motor 13.

In the range change apparatus of each of the first to third embodiments, the range is changed among the four ranges, i.e., the P-range, the R-range, the N-range and the D-range. In addition to these four ranges, other range(s), such as a second range (2) and/or a low range (L) may be added. Here, it should be noted that the first and second embodiments may be applied to the range change apparatus, which changes the range among two or more ranges. Furthermore, the third embodiment may be applied to the range change apparatus, which changes the range among three or more ranges.

Furthermore, the present invention is not limited to the range change apparatus and can be applied to any other types of position change apparatuses, which use the motor as its drive source.

In each of the first to third embodiments, the range change control apparatus 32 may constitute the motor control apparatus of the present invention. Furthermore, the encoder 31, the output shaft sensor 16 and/or the oil temperature sensor 36 may also constitute part of the motor control apparatus.

Additional advantages and modifications will readily occur to those skilled in the art. The invention in its broader terms is therefore not limited to the specific details, representative apparatus, and illustrative examples shown and described.

The invention claimed is:

1. A motor control apparatus that controls a rotational position of an electric motor, which is used as a drive source to change an operational position of a control subject, to a target position of the electric motor that corresponds to a target operational position of the control subject, the motor control apparatus comprising:
   a delimiting position learning means for learning one of first and second delimiting positions of a movable range of the control subject, which correspond to first and second rotational positions of the electric motor, respectively, by rotating the electric motor to a corresponding one of the first and second rotational positions, which corresponds to the one of the first and second delimiting positions of the movable range of the control subject;
   a climb correction amount setting means for setting a climb correction amount for a learning value of the one of the first and second delimiting positions, which is learned by the delimiting position learning means, to correct the learning value of the one of the first and second delimiting positions in view of presence of a relatively small angle of rotation of the electric motor beyond the corresponding one of the first and second rotational positions upon the rotation of the electric motor to the corresponding one of the first and second rotational positions at time of learning the one of the first and second delimiting positions by the delimiting position learning means;
   a reference position learning means for learning a reference position by correcting the learning value of the one of the first and second delimiting positions by the climb correction amount;
   a target position setting means for setting the target position of the electric motor based on the reference position at time of changing the operational position of the control subject; and
   a motor temperature information determining means for sensing or estimating motor temperature information, which is one of a temperature of the electric motor and a temperature that relates to the temperature of the electric motor, wherein the climb correction amount setting means sets the climb correction amount according to the motor temperature information.

2. The motor control apparatus according to claim 1, wherein the climb correction amount setting means sets the climb correction amount based on the motor temperature information and an electric power source voltage of the electric motor.

3. The motor control apparatus according to claim 1, wherein:
   the control subject is a range change mechanism that changes a range of an automatic transmission of a vehicle; and
   the motor temperature information determining means senses an oil temperature of the automatic transmission with an oil temperature sensor and uses the sensed oil temperature of the automatic transmission as the motor temperature information.

4. A motor control apparatus comprising:
   a motor control means for controlling a rotational position of an electric motor, which is used as a drive source to change an operational position of a control subject, to a target position of the electric motor that corresponds to a target operational position of the control subject;
   a reference position learning means for learning one of first and second delimiting positions of a movable range of the control subject, which correspond to first and second rotational positions of the electric motor, respectively, as a reference position by rotating the electric motor to a corresponding one of the first and second rotational positions, which corresponds to the one of the first and second delimiting positions of the movable range of the control subject;
   a play amount learning means for learning a play amount in a rotation transmission system located between the electric motor and the control subject by rotating the electric motor to each of the first and second rotational positions;
   a target position setting means for setting the target position of the electric motor in view of a learning value of the play amount based on a learning value of the reference position, which is learned by the reference position learning means, at time of changing the operational position of the control subject; and
   a motor temperature information determining means for sensing or estimating motor temperature information, which is one of a temperature of the electric motor and a temperature that relates to the temperature of the electric motor, wherein the play amount learning means executes the learning of the play amount upon satisfaction of at least one learning execution condition, which includes falling of the temperature indicated by the motor temperature information into a specific temperature range.

5. The motor control apparatus according to claim 4, wherein:
   the reference position learning means learns the reference position immediately after turning on of an electric power source of the motor control apparatus; and
   the target position setting means sets the target position of the electric motor based on the learning value of the reference position by using a standard value of the play amount in place of the learning value of the play amount before completion of the learning of the play amount by the play amount learning means.

6. The motor control apparatus according to claim 4, wherein:
   the reference position learning means learns the reference position immediately after turning on of an electric power source of the motor control apparatus;
   the target position setting means sets the target position of the electric motor based on the learning value of the reference position without using the learning value of the play amount before completion of the learning of the play amount by the play amount learning means; and the motor control means executes an overshooting control operation at time of changing the operational position of the control subject, so that the electric motor is rotated beyond the target position and is thereafter reversed.

* * * * *